United States Patent [19]

Sensen et al.

[11] Patent Number: 5,505,601
[45] Date of Patent: Apr. 9, 1996

[54] FILM BLOWING HEAD FOR EXTRUDING A TUBULAR WEB OF A THERMOPLASTIC SYNTHETIC MELT

[75] Inventors: Klemens Sensen, Lengerich; Günter Schmitt, Tecklenburg, both of Germany

[73] Assignee: Windmoller & Holscher, Lengerich/Westf., Germany

[21] Appl. No.: 388,540

[22] Filed: Feb. 14, 1995

[30]  Foreign Application Priority Data

Feb. 21, 1994 [DE] Germany ............... 44 05 462.9

[51] Int. Cl.⁶ ..................... B29C 47/20; B29C 47/86
[52] U.S. Cl. ..................... 425/72.1; 425/326.1
[58] Field of Search ............... 425/72.1, 326.1, 425/387.1; 264/565, 210.5, 209.7

[56]  References Cited

U.S. PATENT DOCUMENTS

| | | | |
|---|---|---|---|
| 3,898,028 | 8/1975 | Upmeier | 425/72.1 X |
| 3,902,832 | 9/1975 | Gregory et al. | 425/326.1 X |
| 3,947,170 | 3/1976 | Zimmermann | 425/326.1 X |
| 4,105,380 | 8/1978 | Zimmermann | 425/326.1 X |
| 4,402,656 | 9/1983 | Schott, Jr. | 425/72.1 X |
| 4,606,879 | 8/1986 | Cerisano | 264/565 |
| 4,627,805 | 12/1986 | Schnell | 425/72.1 |
| 4,938,903 | 7/1990 | Schaeffer et al. | 264/565 |
| 5,322,431 | 6/1994 | Kahlen et al. | 425/387.1 X |

FOREIGN PATENT DOCUMENTS

| | | | |
|---|---|---|---|
| 2555848 | 6/1977 | Germany | 425/72.1 |
| 1072730 | 6/1967 | United Kingdom | 264/565 |

*Primary Examiner*—Richard L. Chiesa
*Attorney, Agent, or Firm*—Keck, Mahin & Cate

[57]  ABSTRACT

A film blowing head for extruding a tubular web of a thermoplastic synthetic melt consists of at least one inner cooling ring and a pipe passing through the blowing head, wherein a central pipe is arranged with the formation of an annular space. The annular space is placed in an air conducting communication with the inner cooling ring. The cooling and supporting air is fed via lines into the annular space and is drawn off again through the central pipe. To permit cooling with very cold air, the pipe feeding the cooling air is surrounded, in the zone of the blowing head, by two concentric pipes with the formation of two annular spaces. The two annular spaces are connected with each other in the zone of the plane of the outlet nozzle gap of the blowing head by an overflow compartment that is closed towards the outside. Warm air is fed to one of the annular spaces, and is drawn off again through the other annular space.

4 Claims, 1 Drawing Sheet

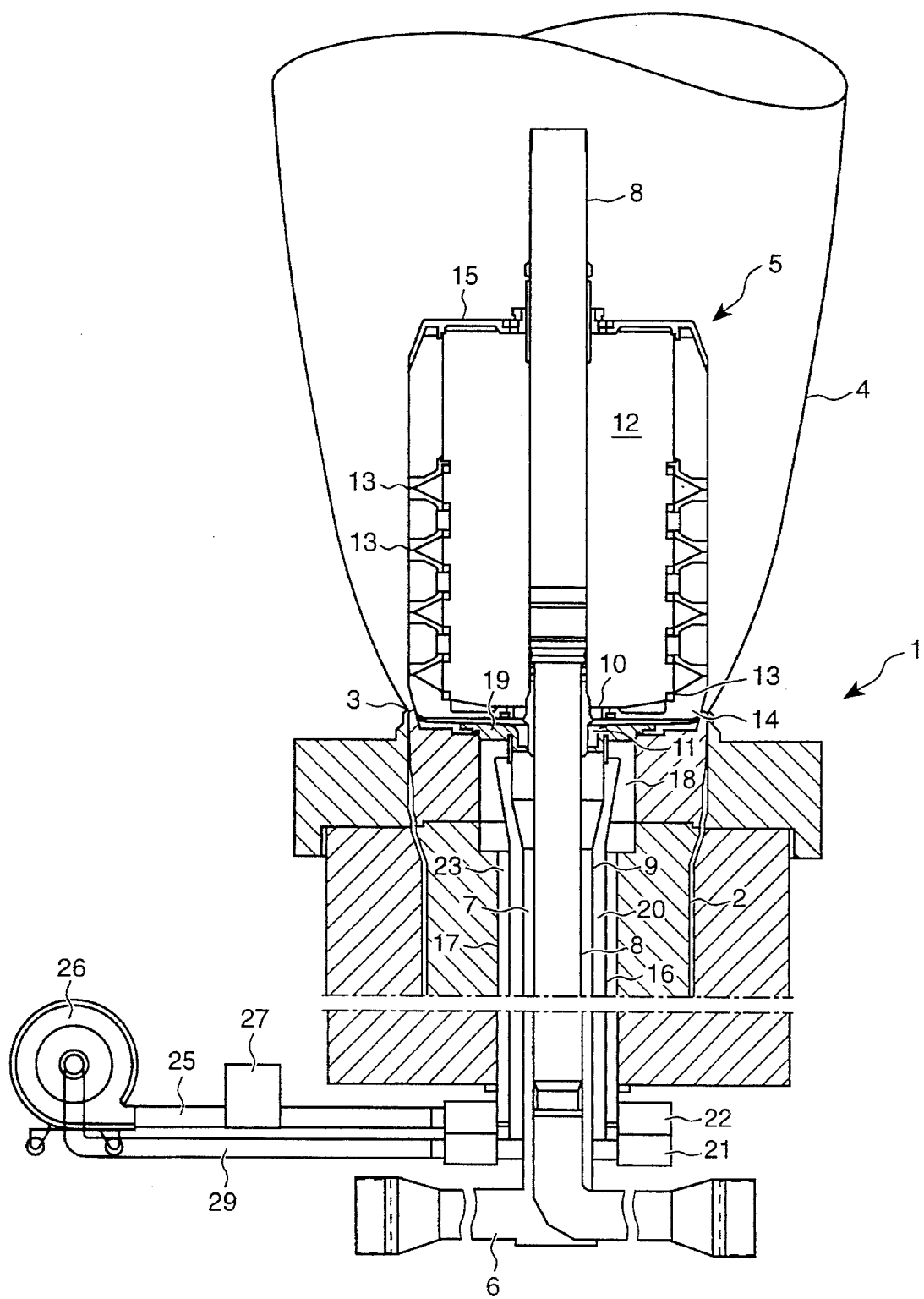

FILM BLOWING HEAD FOR EXTRUDING A TUBULAR WEB OF A THERMOPLASTIC SYNTHETIC MELT

FIELD OF THE INVENTION

The invention concerns a film blowing head for extruding a tubular web of a thermoplastic synthetic melt by the inflation extrusion process, having at least one inner cooling ring, a first pipe passing through the blowing head, and a central pipe, preferably projecting axially beyond the inner cooling ring, is arranged with an annular space between it and the cooling ring. In such an arrangement the annular space is placed in air conducting communication with the inner cooling ring, and cooling and supporting air is fed thereto via lines and is drawn off again through the central suction pipe.

PRIOR ART

It is known that the thermal output of a film blowing installation can be increased by increasing the mass of cooling air discharged per unit time and also by lowering the temperature of the cooling air. Usually, the cooling of a tubular web of a thermoplastic synthetic melt extruded from a film blowing head is effected by cooling air blown out from so-called "outer cooling rings". In such an arrangement the cooling may be efficiently assisted by an internal cooling device which usually consists of one or more inner cooling rings arranged on top of one another, with an outlet gap for the cooling air directed against the interior of the extruded tubular web.

OBJECT OF THE INVENTION

It is an object of the invention to create a film blowing head of the kind indicated in the opening paragraph above, which is provided with an internal cooling means to permit the cooling of the extruded tubular film web with very cold air.

SUMMARY OF THE INVENTION

In accordance with the invention, this problem is solved by a film blowing head for extruding a tubular web of a thermoplastic synthetic melt, including:

at least one inner cooling ring;

a cooling air feed pipe passing through the blowing head;

a central pipe arranged with the formation of an annular space in an air-conducting communication with the inner cooling ring; and means for feeding cooling and supporting air thereto via lines, and for drawing off said air through the central pipe;

wherein in the zone of the blowing head said cooling air feed for feeding the cooling air is surrounded by two concentric pipes with the formation of two annular spaces thereby;

wherein said two annular spaces are connected to each other in the zone of the plane of the outlet nozzle gap of the blowing head by an overflow compartment that is closed towards the outside; and wherein warm air is fed to one of the annular spaces and is drawn off again through the other of said annular spaces.

If cooling air at temperatures of less than 0° C., or very cold air at temperatures in the range of −10° to −25° C., is used for the internal cooling of a film blowing head, there is the risk that the film blowing head will be cooled off in an inadmissible way by the cooling air lines carried through it to such an extent that (i) the temperature of the synthetic melt of the extruded tubular film web, and (ii) additionally the temperature distribution in the extruded synthetic tubular web, will be adversely affected thereby. Thus if the internal cooling device is to be fed with cold or very cold air, special precautions have to be taken to ensure that the film blowing head is not cooled in an inadmissible way.

Now the film blowing head in accordance with the invention permits the use of cold and even very cold air for the internal cooling since the film blowing head is efficiently protected against undue cooling, by the pipes concentrically surrounding the cooling air lines or pipes and which are fed with warm air. The temperature of the warm air circulating through the two annular spaces of the pipes, serving for the insulation, may be adapted to the respective requirements, and in such an arrangement a certain cooling by the cold cooling air fed through the central pipes must, of course, also be accepted.

Expediently, the wall of the outer pipe carrying warm air is formed by the bores of the blowing head.

If very cold air is used for the internal cooling, paraffin deposits may be deposited on the internal cooling means or the inner cooling rings. To avoid such undesired deposits, the inner cooling air may be blown out of cooling rings arranged on top of one another in the manner of tiers, annular suction gaps may be provided between the outlet gaps for the cooling air for drawing off monomer vapours mixed with air, and the cooling rings maybe provided with heat insulation on their side facing the film. Internal cooling means consisting of cooling rings arranged on top of one another in the manner of tiers with suction gaps arranged between the outlet gaps are known per se, and therefore need not be described here in greater detail. The insulation of the cooling ring on the outer sides has the effect of avoiding very cold surfaces on which deposits of paraffin or the like may form.

Advantageously insulating gaps and insulations may be provided between the parts swept by the cooling air and the film blowing head in order to avoid unwanted heat bridges.

BRIEF DESCRIPTION OF THE DRAWINGS

An embodiment of the invention will be explained in greater detail below with reference to the drawing, in which the sole FIGURE is a longitudinal section through a film blowing head, shown in a schematic representation.

DETAILED DESCRIPTION OF THE PREFERRED EMBODIMENT

Apart from the pipes concentrically surrounding the central blowing and suction pipes feeding and evacuating the cooling air, the film blowing head 1 is of a conventional design, so that the basic structure of the film blowing head with internal cooling does not require any special description as it will be well known to the skilled reader.

The film blowing head 1 is provided with an annular melt duct 2 to which a synthetic melt is fed from an extruder via the usual distributing ducts to emerge from the annular nozzle gap 3 in the form of a tubular film web 4 which is inflated into a film bubble by the internal cooling and supporting air.

The film blowing head represented in the drawing is distinguished from conventional film blowing heads in that very cold cooling air, whose temperature may be approximately −25° C. is fed to the internal cooling device 5. The cold internal cooling air is fed by the pipe 6 and passes through the annular space 7 formed between the central suction pipe 8 and a pipe 9 which concentrically surrounds the pipe 8, and then out through annular gaps 10, 11 into the internal cooling device 5 or to the inside of the extruded film tubular web 4. The cooling air emerging from the gap 10 passes into the cylindrical space 12 centrally traversed by the suction pipe 8 for drawing off the cooling air, and it is blown out from this space 12 through the cooling air gaps 13. The cooling air emerging from the gap 11 emerges between the lower ring 14 of the internal cooling device 5 and the inner ring of the nozzle gap 3 of the film blowing head.

The cylindrical internal cooling device 5, formed by individual rings, is closed at its top by an annular cover 15. The internal cooling device 5 is thermally insulated on its outer side and with respect to the film blowing head 1. The internal cooling device 5 may be provided, between its outlet gaps 13, with suction gaps or openings which are however known to the expert in this art and will therefore not be described in greater detail herein.

The cooling air feeder pipe 9 is concentrically surrounded by two pipes 16, 17 carrying insulating warm air, in which arrangement the pipe 17 may be in the form of a bore centrally passing through the film blowing head 1. In the upper zone of the film blowing head 1 the pipe 17 is widened into an annular chamber which is closed towards the outside by an annular cover 19 and which leads into the pipe 16 under the cover 19. Insulating warm air is fed to the annular space 23 formed between the outer pipe 17 and the pipe 16 via an annular warm air distributing duct 22 connected, via a line 25, to the pressure side of a fan 26. In such an arrangement a heating appliance 27 is disposed in the line 25 for heating the warm insulating air. For the recirculation of the warm insulating air, the annular duct 20, which is formed between the pipes 9 and 16, is also provided at its lower end with an annular air distributor duct 21 which is connected to the fan 26 via a line 29.

Thus the warm air from the fan 26 and heater 27 passes up into the film blowing head in the annular space 23 and returns to the fan 26 by way of the annular duct 20. However, this flow path may, if desired, be reversed.

We claim:

1. A film blowing head for extruding a tubular web of a thermoplastic synthetic melt, comprising:

at least one inner cooling ring;

a cooling air feed pipe passing through the blowing head; and a central pipe arranged with the formation of an annular space in an air-conducting communication with the inner cooling ring; and means for feeding cooling and supporting air thereto via lines, and for drawing off said air through the central pipe;

wherein:

in a zone of the blowing head, said cooling air feed pipe for feeding the cooling air is surrounded by two concentric pipes with formation of two annular spaces thereby;

said two annular spaces are connected to each other in a zone of a plane of an outlet nozzle gap of the blowing head by an overflow compartment that is closed towards the outside; and warm air is fed to one of the two annular spaces and is drawn off again through the other of said two annular spaces.

2. A film blowing head according to claim 1, wherein said central pipe projects axially beyond the inner cooling ring.

3. A film blowing head according to claim 1, wherein a wall of an outer pipe of the two concentric pipes is defined by bores of the film blowing head.

4. A film blowing head according to claim 1, wherein the inner cooling air is blown out of cooling rings arranged as tiers on top of one another; wherein annular suction gap means, for drawing off monomer vapors mixed with air, are provided between outlet gaps for the cooling air; and wherein the cooling rings are provided with heat insulation on sides facing the tubular film web.

* * * * *